(12) United States Patent
Yagi et al.

(10) Patent No.: US 7,780,571 B2
(45) Date of Patent: Aug. 24, 2010

(54) AUTOMATIC TRANSMISSION CONTROL APPARATUS

(75) Inventors: Kan Yagi, Fuji (JP); Jun Yoshino, Fuji (JP); Hitoshi Yokose, Fuji (JP); Tsuyoshi Mori, Fuji (JP); Katsunori Satou, Sagamihara (JP); Masaya Kubota, Fuji (JP); Hiroyuki Takenaka, Yamato (JP); Makoto Hashimoto, Atsugi (JP)

(73) Assignee: JATCO Ltd, Fuji-shi (JP)

( * ) Notice: Subject to any disclaimer, the term of this patent is extended or adjusted under 35 U.S.C. 154(b) by 293 days.

(21) Appl. No.: 12/138,486

(22) Filed: Jun. 13, 2008

(65) Prior Publication Data

US 2008/0312036 A1 Dec. 18, 2008

(30) Foreign Application Priority Data

Jun. 15, 2007 (JP) .............................. 2007-158840

(51) Int. Cl.
*F16H 59/30* (2006.01)
(52) U.S. Cl. ..................................... 477/121
(58) Field of Classification Search ........................ None
See application file for complete search history.

(56) References Cited

U.S. PATENT DOCUMENTS

| | | | | |
|---|---|---|---|---|
| 5,042,329 A | * | 8/1991 | Ueki et al. | 477/125 |
| 5,089,965 A | * | 2/1992 | Braun | 701/52 |
| 5,150,634 A | * | 9/1992 | Wakahara | 477/125 |
| 5,390,117 A | * | 2/1995 | Graf et al. | 701/57 |
| 5,416,698 A | * | 5/1995 | Hutchison | 701/51 |
| 2001/0011051 A1 | * | 8/2001 | Hattori et al. | 477/121 |

FOREIGN PATENT DOCUMENTS

JP 11-048830 2/1999

* cited by examiner

*Primary Examiner*—Dirk Wright
(74) *Attorney, Agent, or Firm*—Global IP Counselors, LLP

(57) ABSTRACT

An automatic transmission control apparatus includes an engine rotational speed limit verifying section and a shift control characteristic changing section. The engine rotational speed limit verifying section is configured to receive an engine rotational speed limit value for limiting an engine rotational speed and determine if the engine rotational speed limit value is lower than a prescribed normal upper limit value. The shift control characteristic changing section is configured to change a shift schedule of an automatic transmission based on the engine rotational speed being limited by the engine rotational speed limit value and the automatic transmission having a stronger tendency to select a higher gear stage than if the engine rotational speed limit value was not being limited to a lower value than the prescribed normal limit value, when the engine rotational speed limit value is determined to lower than the prescribed normal upper limit value.

10 Claims, 12 Drawing Sheets

| GEAR | MAP | POINT "A" BEFORE LIMIT CHANGE | POINT "A" AFTER LIMIT CHANGE | POINT "B" AFTER LIMIT CHANGE |
|---|---|---|---|---|
| 3RD | UP | COMPULSORY UPSHIFT | HOLD COMPULSORY UPSHIFT | NORMAL SHIFT SCHEDULE |
| 4TH (CRUISING GEAR) | DN | DOWNSHIFT PROHIBITION | HOLD DOWNSHIFT PROHIBITION | NORMAL SHIFT SCHEDULE |

FIG. 10

AUTOMATIC TRANSMISSION CONTROL APPARATUS

CROSS-REFERENCE TO RELATED APPLICATIONS

This application claims priority to Japanese Patent Application No. 2007-158840, filed on Jun. 15, 2007. The entire disclosure of Japanese Patent Application No. 2007-158840 is hereby incorporated herein by reference.

BACKGROUND OF THE INVENTION

1. Field of the Invention

The present invention generally relates to technology for changing a shift characteristic of an automatic transmission connected to an engine to transmit power from the engine. More specifically, the present invention relates to changing of the shift characteristic of an automatic transmission to enable the rotational speed of the engine to be limited to an upper limit value in a satisfactory manner when the upper limit value is being limited to a lower rotational speed due to such circumstances as execution of an engine protection control, the engine system being cold, or execution of a failsafe control.

2. Background Information

Many vehicles are provided with a shift control apparatus to control shifting of an automatic transmission connected to an engine to transmit power from the engine. One example of shift control apparatus is disclosed in Japanese Laid-Open Patent Publication No. 11-48830, which discloses limiting an upper limit value of the engine rotational speed to a lower engine rotational speed limit than normal and changing a shift characteristic of a shift schedule of the automatic transmission in a direction of a lower vehicle speed.

In Japanese Laid-Open Patent Publication No. 11-48830, the engine control apparatus and the shift control apparatus cooperate together when an upper limit value of the engine rotational speed is being limited to a lower rotational speed due to certain circumstances occurring. In particular the engine control apparatus reduces an overlap angle of a variable valve system of the engine and lowers a maximum rotational speed limit of the engine, i.e., lowers a red zone, allowable rotational speed, or rotational speed upper limit value of the engine. Simultaneously, the shift control apparatus changes a shift characteristic curve of a shift schedule of the automatic transmission toward a lower vehicle speed such that the automatic transmission tends to upshift, i.e., such that a higher gear stage or lower gear ratio is selected than under normal circumstances in which the maximum rotational speed limit is not lowered. As a result, the engine rotational speed decreases when the automatic transmission is in a higher gear stage or lower gear ratio.

In view of the above, it will be apparent to those skilled in the art from this disclosure that there exists a need for an improved shift control apparatus. This invention addresses this need in the art as well as other needs, which will become apparent to those skilled in the art from this disclosure.

SUMMARY OF THE INVENTION

It has been discovered that a problem exists when the shift control apparatus merely changes the shift characteristic curve of the shift schedule of the automatic transmission toward a lower vehicle speed. More specifically, the engine control apparatus does not limit the upper limit value of the engine rotational speed to a lower engine rotational speed limit than usual only when the overlap angle of the valve system is reduced. Rather, there are various situations in which the engine control apparatus limits the upper limit value of the engine rotational speed, e.g., when an engine protection control is being executed, the engine system is cold, or when a failsafe control is being executed. Consequently, the degree to which the engine rotational speed limit is lowered in comparison to the normal upper limit value varies depending on the situation. There are times when the engine rotational speed limit is lowered only slightly below the normal upper limit value and there are times when the engine rotational speed limit is set to be much lower than the normal upper limit value.

As shown in FIG. 12, the shift schedule of the automatic transmission control apparatus of Japanese Laid-Open Patent Publication No. 11-48830 only has a set of normal shift characteristic curves indicated with single-dot chain lines and a set of changed shift characteristic curves indicated with solid lines. The shift characteristic curves of the changed shift schedule are set to correspond to a smallest engine rotational speed limit (i.e., an engine rotational speed limit that is the farthest from the normal engine rotational speed upper limit). Thus, the technology of Japanese Laid-Open Patent Publication No. 11-48830 changes the shift characteristic curves of the shift schedule to the same lower vehicle speed shift characteristic curves (indicated with solid lines) regardless of the magnitude of the engine rotation speed limit. Even when the lowered engine rotational speed limit is only slightly smaller than the normal upper limit, the same shift characteristic curves are used as when the lowered engine rotational speed limit is much smaller than the normal upper limit (by the largest possible amount) and the engine rotational speed is being severely limited. Consequently, upshifting occurs suddenly at lower rotational speeds, as indicated with the arrows S1 and S2 in FIG. 12, and the driver experiences a feeling that there is something odd about the performance of the vehicle.

One object of the present invention is to provide an automatic transmission control technology that can prevent such frequent upshifting of the automatic transmission and achieve an appropriate limitation of the engine rotational speed.

In order to achieve the object, an automatic transmission control apparatus is provided that basically comprises an engine rotational speed limit verifying section and a shift control characteristic changing section. The engine rotational speed limit verifying section is configured to receive an engine rotational speed limit value for limiting an engine rotational speed and determine if the engine rotational speed limit value is lower than a prescribed normal upper limit value. The shift control characteristic changing section is configured to change a shift schedule of an automatic transmission based on the engine rotational speed being limited by the engine rotational speed limit value and the automatic transmission having a stronger tendency to select a higher gear stage than if the engine rotational speed limit value was not being limited to a lower value than the prescribed normal limit value, when the engine rotational speed limit value is determined to lower than the prescribed normal upper limit value.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 10 is a table summarizing the content of FIGS. 7 to 9;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
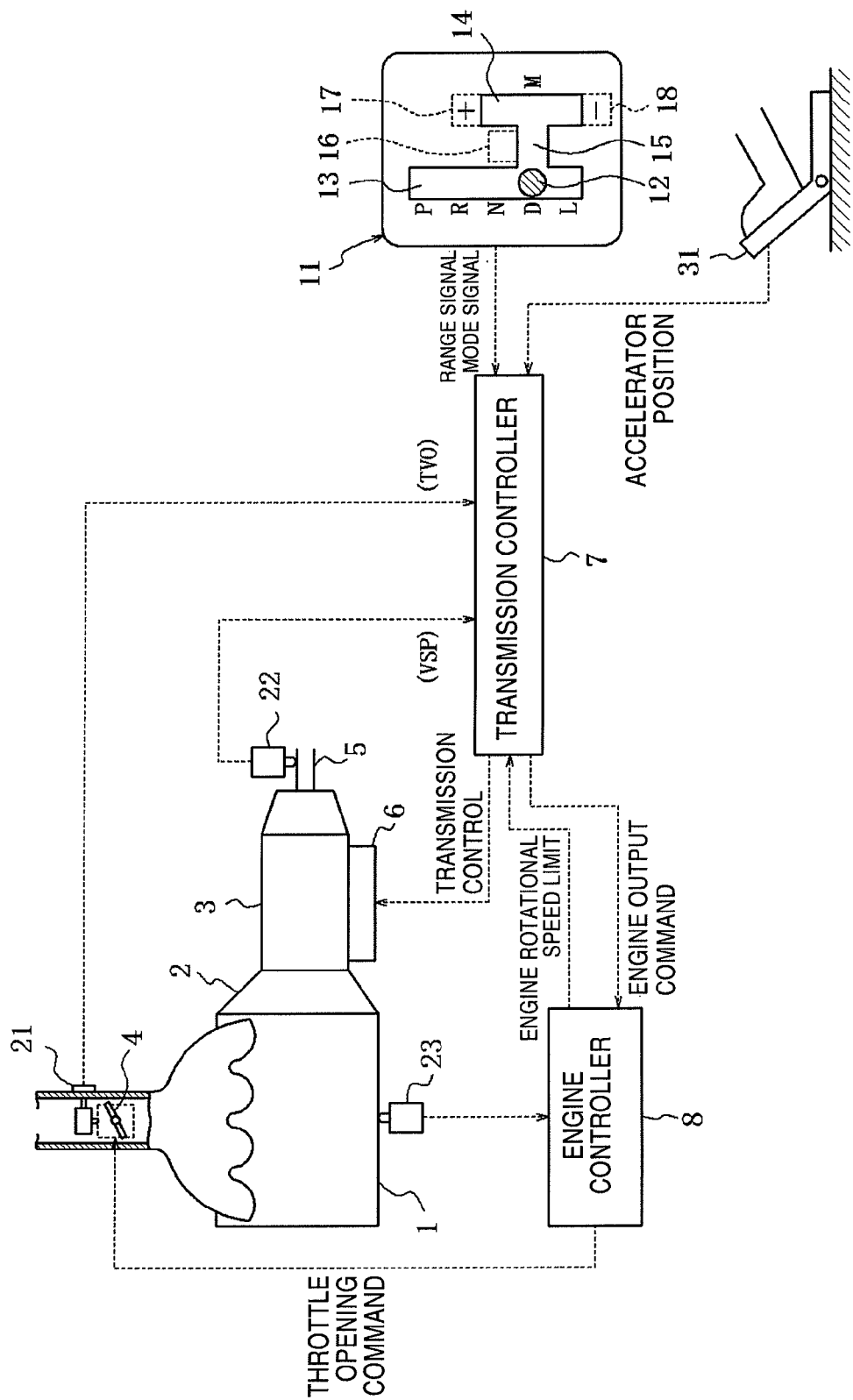
FIG. 1 is a control system diagram showing a power train and control system of a vehicle equipped with an automatic transmission control apparatus in accordance with an embodiment.

Referring initially to FIG. 1, a vehicle power train is diagrammatically illustrated with an automatic transmission control apparatus in accordance with one embodiment. The vehicle power train includes an internal combustion engine 1, a torque converter 2 and an automatic transmission 3. FIG. 1 also diagrammatically shows an engine control system of the engine 1.

The automatic transmission 3 is arranged to receive power from the engine 1 via the torque converter 2. In other words, the torque converter 2 is connected between the engine 1 and the automatic transmission 3 to transfers power from the engine 1 to the automatic transmission 3. The torque converter 2 has a lockup mechanism. The output of the engine 1 is increased and decreased with a throttle valve 4 and transferred through the torque converter 2 to the automatic transmission 3. The automatic transmission 3 converts the rotational speed and torque of the rotation received from the engine 1 in accordance with a selected gear and transmits the rotation toward drive wheels (not shown) with an output shaft 5. The rotation transferred to the drive wheels enables the vehicle to move.

Basically, the automatic transmission control apparatus of the illustrated embodiment controls shifting of the automatic transmission 3 with respect to the engine rotational speed limit value that was set. More specifically, as explained below, the automatic transmission control apparatus determines an amount by which the shift schedule will be changed based on the engine rotational speed limit. As a result, upshifting can be executed at rotational speeds close to the normal rotational speeds when the engine rotational speed limit is large, i.e., close to a prescribed normal upper limit value, and the driver can be prevented from experiencing a feeling that something is odd about the vehicle performance. Furthermore, upshifting of the automatic transmission 3 can be executed in an appropriate fashion with respect to the magnitude of the set engine rotational speed limit. In the illustrated embodiment, a transmission controller 7 is provided that basically constitutes the automatic transmission control apparatus.

It is acceptable for the automatic transmission 3 to have either discrete gears or a continuously variable gear ratio, but this embodiment will be explained for an automatic transmission having four discrete gears, including a reverse gear. The automatic transmission 3 has a control valve unit 6 for controlling the gear shifting thereof. The automatic transmission 3 is shifted from the currently selected gear to a target gear by switching solenoid valves of a hydraulic circuit inside the control valve unit 6. The transmission controller 7 issues on-off signals for the solenoid valves of the control valve unit 6.

The transmission controller 7 preferably includes a microcomputer with a shift control program that controls the shifting of the automatic transmission 3 as discussed below. The transmission controller 7 can also include other conventional components such as an input interface circuit, an output interface circuit, and storage devices such as a ROM (Read Only Memory) device and a RAM (Random Access Memory) device. The transmission controller 7 reads information related to the driving state, e.g., accelerator position and vehicle speed VSP, and controls the shifting of the automatic transmission 3 with a pre-stored shift schedule (described later). In conjunction with the shift control of the automatic transmission 3, the transmission controller 7 also executes control to connect and release a lockup clutch of the torque converter 2. Consequently, various signals from various sensors are fed to the transmission controller 7. A throttle opening sensor 21 is provided that is configured and arranged to detect an opening degree (throttle opening) TVO of the throttle valve 4, which indicates the engine load, and to output a signal indicative of the throttle opening degree (engine load) to the transmission controller 7. A vehicle speed sensor 23 is provided that is configured and arranged to detect an output rotational speed of the transmission 3, i.e., the rotational speed of the transmission output shaft 5, which corresponds to the vehicle speed VSP, and to output a signal indicative of the vehicle speed VSP to the transmission controller 7. A selector mechanism 11 is provided that is configured and arranged to set an automatic transmission mode (D, L) or a manual shift mode (M) in response to operation of a selector lever 12 by a driver, and to output a signal to the transmission controller 7 that is indicative of the selected mode and the selected range corresponding to the selected position. A accelerator pedal 31 is provided that is configured and arranged to operate the throttle valve 4, and to output a signal to the transmission controller 7 that is indicative of a position of the accelerator pedal 31 resulting from operation thereof by the driver.

The selector mechanism 11 has a main gate 13 having a Park (P) position, a Reverse (R) position, a Neutral (N) position, a Low (L) position (engine braking), and a Drive (D) position (automatic shifting) and a subordinate gate 14 having a manual shift mode (M) position. The main gate 13 and the subordinate gate 14 are connected by a mode selection gate 15. The selector lever 12 is provided such that it can be moved along the gates 13 to 15. A mode detecting switch 16 is provided in the mode selection gate 15 for issuing an on-signal when the selector lever 12 is moved from the main gate 13 to the subordinate gate 14 and an off-signal when the selector lever 12 is moved from the subordinate gate 14 to the main gate 13.

As shown in FIG. 1, when the driver moves the selector lever 12 to the desired position (P, R, N, D, or L) of the main gate 13, a mode signal and a range signal corresponding to the selected position are sent to the transmission controller 7. The transmission controller 7 then determines a gear of the automatic transmission 3 based on the range signal and the mode signal and shifts the automatic transmission 3 by operating the control valve unit 6. More specifically, when the automatic shift mode (D or L) is selected with the selector lever 12, the transmission controller 7 receives an automatic shift mode (D or L) signal and determines a target gear based on a shift schedule (exemplified in FIG. 5, discussed later) configured to determine a gear of the automatic transmission 3 in accordance with such vehicle driving conditions as the accelerator position and the vehicle speed VSP. The automatic transmission 3 then selects the target gear.

Meanwhile, when the subordinate gate 14 is selected with the selector lever 12, the selector lever 12 is elastically held in a manual shift (M) mode position located between an upshift (+) position 17 and a downshift (−) position 18. Each time the driver moves the selector lever 12 to the upshift (+) position, an upshift command is issued to the transmission controller 7 such that the selected gear changes to the next higher gear stage (one gear stage higher). Conversely, each time the driver moves the selector lever 12 to At the downshift (−) position, a downshift command is issued to the transmission controller 7 such that the selected gear changes to the next lower gear stage (one gear stage lower). As a result, the transmission controller 7 determines the gear corresponding to the manual operation of the selector lever 12 and controls the control valve unit 6 so as to upshift or downshift the automatic transmission 3. In short, the selector mechanism 11 is a mode selecting device for selecting either the automatic shift mode or the manual shift mode (manual mode).

The accelerator pedal 31 is not mechanically linked to the throttle valve 4 of the engine 1. Instead, the accelerator pedal 31 issues an accelerator pedal position signal to the transmission controller 7, and the transmission controller 7 calculates an engine output command based on the accelerator position and issues the engine output command to an engine controller 8.

The engine controller 8 preferably includes a microcomputer with a shift control program that controls the rotational speed of the engine 1. The engine controller 8 can also include other conventional components such as an input interface circuit, an output interface circuit, and storage devices such as a ROM (Read Only Memory) device and a RAM (Random Access Memory) device. The engine controller 8 calculates a throttle opening command based on the engine output command and issues the throttle opening command to the throttle valve 4. Thus, the throttle opening of the throttle valve 4 is basically proportional to the position (depression amount) of the accelerator pedal 31, but it is also possible for the engine controller 8 to execute control of the throttle opening that is independent of the accelerator position, such as, for example, when the upper limit value of the engine rotational speed is limited to an engine rotational speed limit that is lower than a prescribed normal red zone. Also an engine coolant temperature sensor 23 is provided that is configured and arranged to detect a state of the engine 1. Therefore, the engine output command from the transmission controller 7 and a signal from the engine coolant temperature sensor 23 are fed to the engine controller 8. Instead of an engine coolant temperature sensor, the engine coolant temperature sensor 23 can also be a sensor configured to detect the temperature of the engine oil or to detect some other parameter that indicates the state of the engine.

The engine controller 8 can, therefore, limit an upper limit value (red zone) of the engine rotational speed to an engine rotational speed limit that is lower than normal by reducing the throttle opening TVO as required in order to protect the engine when the engine coolant temperature exceeds a normal temperature region. During such an engine speed limit control, the engine controller 8 sends the current engine rotational speed limit to an engine rotational speed limit verifying section of the transmission controller 7, where the current engine rotational speed limit of the rotational speed of the engine 1 is received. The engine rotational speed limit is calculated by the engine controller 8 based on a state of the engine 1, such as the engine coolant temperature, a failsafe, or a state of the engine variable valve system. Consequently, the engine rotational speed limit can vary from only slightly smaller than the prescribed normal upper limit value to much smaller than the prescribed normal upper limit value depending on the particular engine state.

The transmission controller 7 changes the shift schedule such that the automatic transmission 3 has a stronger tendency to upshift than with the normal shift schedule used when the engine rotational speed is not being limited.

Figure 2:
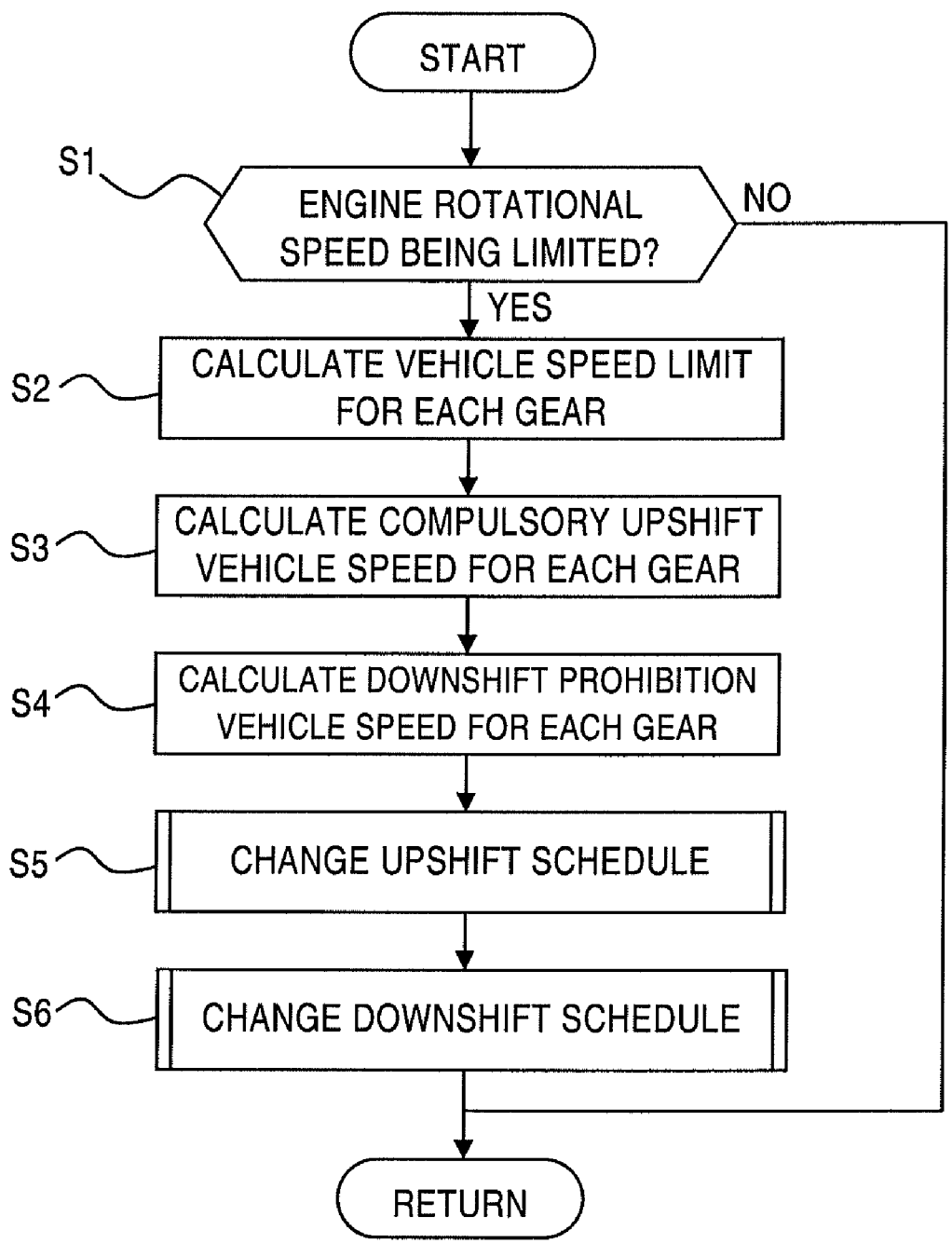
FIG. 2 is a main flowchart showing the control processing executed in the same embodiment in order to change a shift schedule used for shift control of the automatic transmission.

FIG. 2 is a main flowchart showing the control processing executed by the transmission controller 7 in order to change the shift schedule. This control processing is executed repeatedly according to a prescribed time interval (e.g., every 10 milliseconds).

In step S1, the transmission controller 7 receives a current engine rotational speed limit from the engine controller 8 determines if the engine rotational speed is being limited, i.e., if an upper limit value of the rotational speed of the engine 1 is being limited to an engine rotational speed limit that is lower than a prescribed normal upper limit value. Thus, step S1 constitutes an engine rotational speed limit verifying section of the transmission controller 7. When the engine rotational speed is being limited to an upper limit value that is lower than the prescribed normal upper limit value, the automatic transmission has a stronger tendency to select a higher gear stage or lower gear ratio than when the engine rotational speed is not being limited. If the rotational speed upper limit value of the engine 1 is normal (i.e., if the result of step S1 is No), then the transmission controller 7 ends the control loop. If the rotational speed upper limit value of the engine 1 is being limited (i.e., of the result of step S1 is Yes), then the transmission controller 7 proceeds to step S2.

In step S2, the transmission controller 7 calculates a vehicle speed limit VL for each of the gears of the automatic transmission 3. More specifically, the vehicle speed limit VL of each gear is calculated by multiplying the engine rotational speed limit calculated by the engine controller 8 by a final reduction ratio of the portion of the power train from the transmission output shaft 5 to the drive wheels and multiplying the result by the individual gear ratios of the gears of the automatic transmission 3. So long as the vehicle speed VSP does not exceed the calculated vehicle speed limit VL, the engine rotational speed will be limited to the engine rotational speed limit or below. If the vehicle speed VSP is too high, the engine rotational speed can be limited to the engine rotational speed limit by selecting a higher gear stage.

In step S3, the transmission controller 7 calculates a compulsory upshift vehicle speed VU for each gear of the automatic transmission 3. More specifically, the compulsory upshift vehicle speed VU of each gear is calculated by subtracting a pre-stored vehicle speed margin from each of the vehicle speed limits VL. The vehicle speed margin is set to ensure that the engine rotational speed is limited to the engine rotational speed limit or below. Since a certain amount of time is required to actually accomplish changing the gear of the automatic transmission 3, the margin is used to ensure that the engine rotational speed does not exceed the engine rotational speed limit even if the engine rotational speed does increase during the process of upshifting the automatic transmission 3. It is acceptable either to use a common value for the vehicle speed margin for all of the gears or to use a different vehicle speed margin value for each gear. In the latter case, the vehicle speed margins are set such that the value of the vehicle speed margin becomes larger as the gear becomes lower.

In step S4, the transmission controller 7 calculates a downshift prohibition vehicle speed VF for each gear of the automatic transmission 3. More specifically, the downshift prohibition vehicle speed VF for each gear is calculated by subtracting a pre-stored downshift vehicle speed margin from each of the compulsory upshift vehicle speeds VU. The downshift vehicle speed margin is used to ensure that the engine rotational speed is limited to the engine rotational speed limit or below. There are situations in which the driver fully depresses the accelerator pedal 31 and the automatic transmission 3 downshifts while the vehicle speed VSP remains unchanged. Such a situation is called "kick down." The downshift prohibition vehicle speed VF of each gear is set, i.e., the downshift vehicle speed margin is set, such that even during a kick down situation, downshifting that would result in the engine rotational speed exceeding the engine rotational speed limit is prohibited. It is acceptable either to use a common value for the downshift vehicle speed margin for all of the gears or to use a different vehicle speed margin value for each gear. In the latter case, the vehicle speed margins are set such that such that the value of the vehicle speed margin becomes larger as the gear becomes lower. Even if the downshift vehicle speed margin is set to 0, downshifting that would result in the engine rotational speed exceeding the engine rotational speed limit can be rendered impossible.

In step S5, the transmission controller 7 changes the upshift characteristic curves of the shift schedule toward lower vehicle speeds based on the compulsory upshift vehicle speeds VU. Thus, step S5 constitutes an upshift characteristic curve changing section of the transmission controller 7 that is configured to enable upshifting when the engine rotational speed is equal to or below the engine rotational speed limit by changing an upshift characteristic curve of the shift schedule such that as the engine rotational speed limit becomes smaller, the upshift characteristic curve is changed farther in a direction of lower vehicle speeds.

In step S6, the transmission controller 7 changes the downshift characteristic curves of the shift schedule toward lower vehicle speeds based on the downshift prohibition vehicle speeds VF. Thus, step S6 constitutes a downshift characteristic curve changing section of the transmission controller 7 that is configured to prohibit downshifting that would cause the engine rotational speed to exceed the engine rotational speed limit by changing a downshift characteristic curve of the shift schedule such that as the engine rotational speed limit becomes smaller, the downshift characteristic curve is changed farther in a direction of lower vehicle speeds.

Then, the transmission controller 7 ends the control loop.

Figure 3:
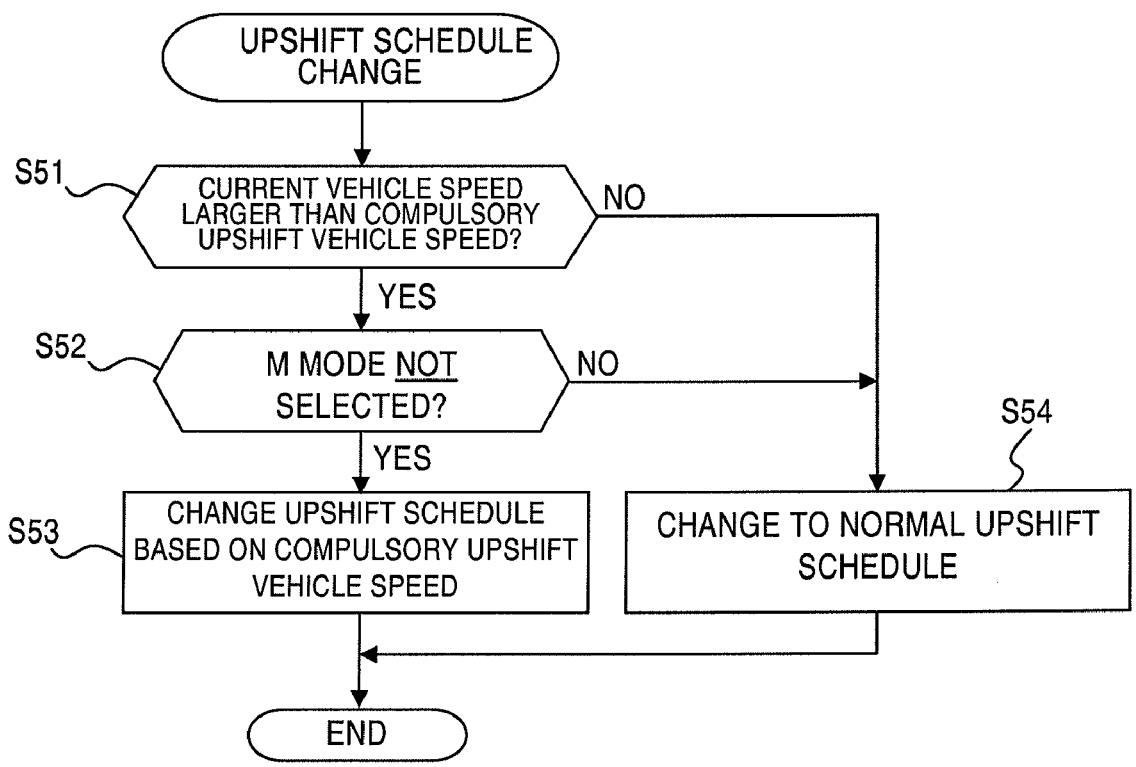
FIG. 3 is a subordinate flowchart showing control processing executed in the illustrated embodiment in order to change an upshift schedule of the automatic transmission.

FIG. 3 is a subordinate flowchart showing the control processing executed in step S5 in order to change the upshift schedule.

In step S51, the transmission controller 7 determines if the current vehicle speed VSP is larger than the compulsory upshift vehicle speed VU corresponding to the current gear that was calculated in step S3 of the main flowchart. If the current vehicle speed VSP is equal to or smaller than the compulsory upshift vehicle speed VU (i.e., if the result is No), then the intended limitation of the engine rotational speed has been achieved and the transmission controller 7 proceeds to step S54, where it changes back to the normal upshift schedule. The reason for step S54 is that since the vehicle speed VSP is already equal to or below the compulsory upshift vehicle speed VU, upshifting will not occur even if the upshift schedule is changed based on the compulsory upshift vehicle speed VU. Thus, changing the upshift schedule would be meaningless. After step S54, the transmission controller 7 ends the control loop.

The next time the main flowchart (FIG. 2) is executed, the shift schedule can be changed again based on the latest compulsory upshift vehicle speed VF. Consequently, the automatic transmission 3 can be shifted appropriately in accordance with the magnitude of the set engine rotational speed limit.

Meanwhile, if it determines in step S51 that the current vehicle speed VSP is larger than the compulsory upshift vehicle speed VU (i.e., if the result of step S51 is Yes), then the transmission controller 7 proceeds to step S52.

In step S52, the transmission controller 7 checks to make sure that the manual shift (M) mode is not currently selected. Thus, step S52 constitutes a manual shift mode determining section of the transmission controller 7 that is configured to determine selection of a manual shift mode in which the automatic transmission 3 is shifted in response to a shift operation performed by a driver.

If the M mode is currently selected (i.e., if the result of step S52 is No), then the transmission controller 7 proceeds to step S54 and changes the upshift schedule to the normal upshift schedule because a compulsory upshift schedule is not needed. The transmission controller 7 then ends the control loop.

If it determines in step S52 that an automatic shift mode (D or L) is currently selected (i.e., if the result of step S52 is Yes), then the transmission controller 7 proceeds to step S53.

In step S53, the transmission controller 7 changes the upshift schedule based on the compulsory upshift vehicle speeds VU calculated in step S3 such that the automatic transmission 3 has a stronger tendency to select a higher gear stage than if the engine rotational speed was not being limited. The transmission controller 7 then ends the control loop. In short, the upshift schedule can be changed such that the engine rotational speed is below the engine rotational speed limit by changing the upshift schedule based on the engine rotational speed limit and the vehicle speed margins. The selected gear of the automatic transmission 3 upshifted in comparison to when the engine rotational speed is not limited and the engine rotational speed can be held equal to or below each particular engine rotational speed limit that is set.

Figure 4:
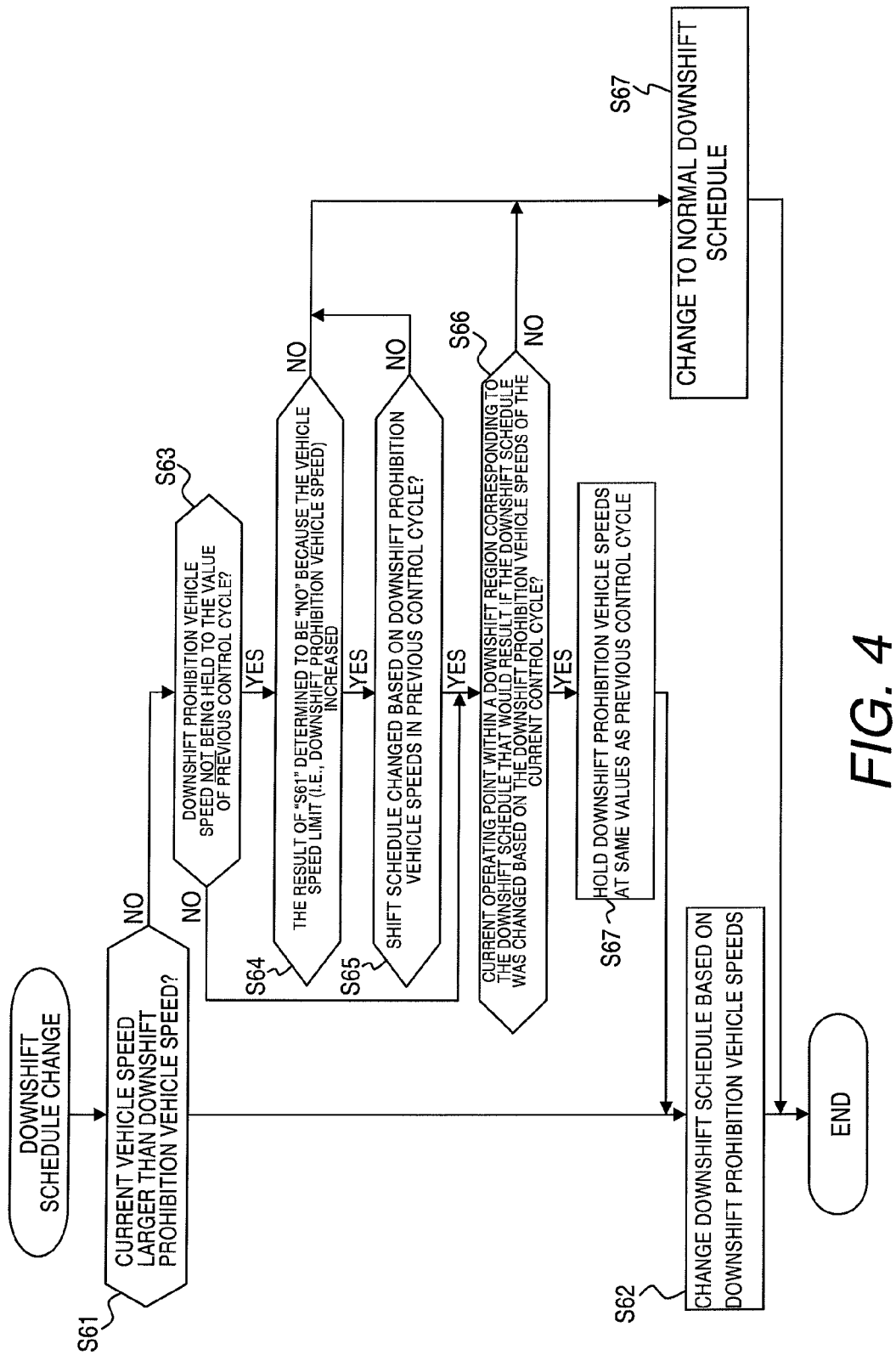
FIG. 4 is a subordinate flowchart showing control processing executed in the illustrated embodiment in order to change a downshift schedule of the automatic transmission.

FIG. 4 is a subordinate flowchart showing the control processing executed in step S6 in order to change the downshift schedule.

In step S61, the transmission controller 7 determines if the current vehicle speed VSP is larger than the downshift prohibition vehicle speed VF corresponding to the current gear calculated in step S4. If the current vehicle speed VSP is larger than the downshift prohibition vehicle speed VF (i.e., if the result of step S61 is Yes), then the transmission controller 7 proceeds to step S62.

In step S62, the transmission controller 7 changes the downshift schedule based on the downshift prohibition vehicle speeds VF calculated in step S4 such that the automatic transmission 3 has a stronger tendency to select a higher gear stage than if the engine rotational speed was not being limited. The transmission controller 7 then ends the control loop. In short, downshifting that would cause the rotational speed of the engine 1 to exceed the engine rotational speed limit can be prohibited by changing the downshift schedule based on the engine rotational speed limit and the downshift vehicle speed margins.

Figure 5:
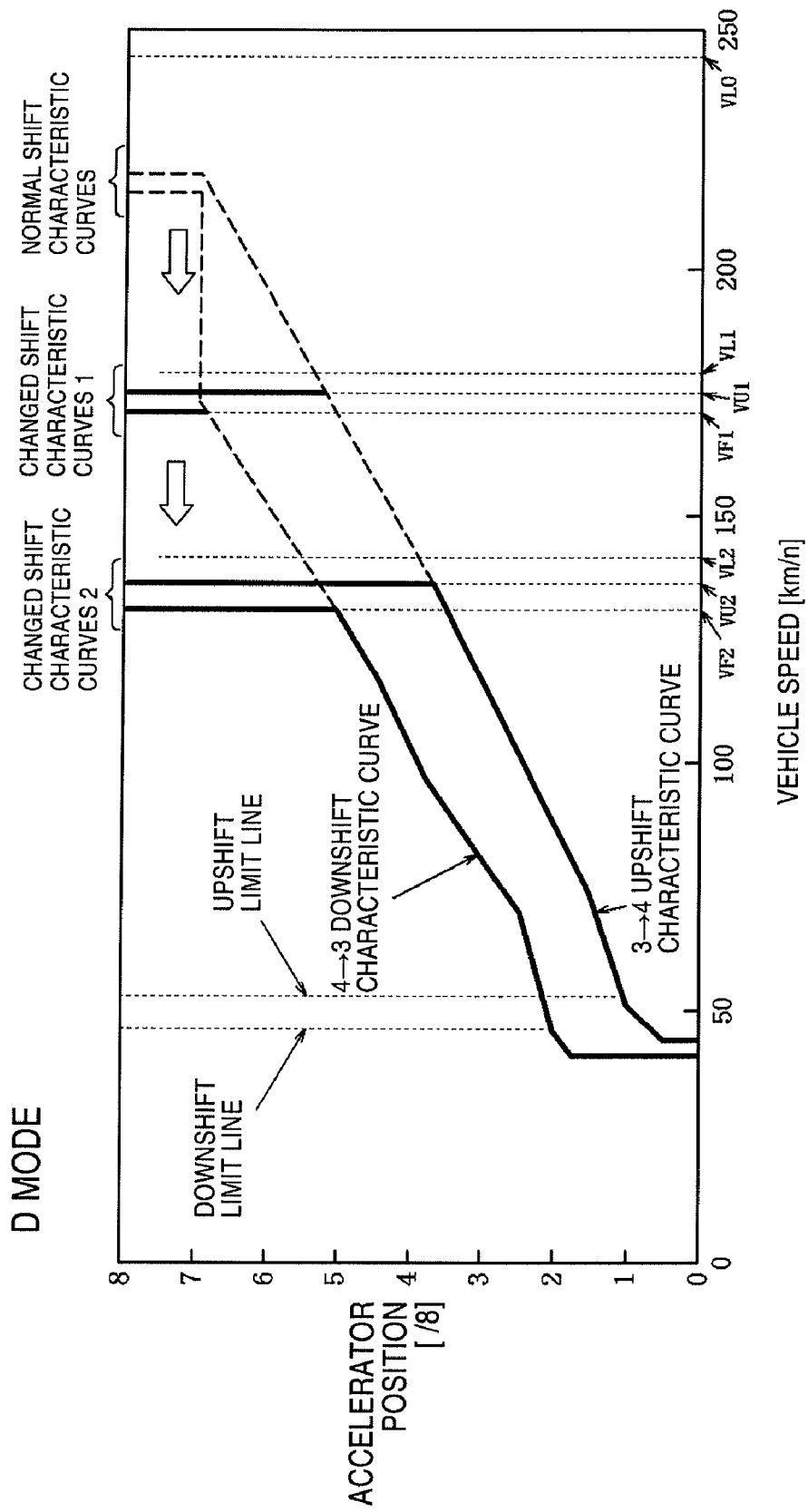
FIG. 5 is a shift characteristic diagram showing an example of how the shift schedule is changed in accordance with the illustrated embodiment when an automatic shift (D) mode is selected.

If the driver moves the selector lever 12 to the upshift (+) position 17 of the subordinate gate 14 while the M mode is selected, then the automatic transmission 3 will upshift in response to the driver's upshift operation without regard for the changed upshift characteristic curves shown in FIG. 5.

Even when the downshift schedule is changed as described above, downshifting of the automatic transmission 3 that will not result in the engine rotational speed exceeding the engine rotational speed limit is not prohibited. In other words, such downshifting is permitted and if the driver moves the selector lever 12 to the downshift (−) position 18 of the subordinate gate 14, then the automatic transmission 3 will downshift in response to the driver's downshift operation so long as doing so will not cause the engine rotational speed limit to be exceeded.

If in step S61 the transmission controller 7 determines that current vehicle speed VSP is equal to or below than the downshift prohibition vehicle speed VF (i.e., if the result of step S61 is No), then the transmission controller 7 proceeds to step S63.

In step S63, the transmission controller 7 checks to make sure that the downshift prohibition vehicle speed VF was not held in step S67 of the previous control cycle. If the downshift prohibition vehicle speed VF has been changed (i.e., if the result of step S63 is Yes), then the transmission controller 7 proceeds to step S64.

In step S64, the transmission controller 7 determines if the result of step S61 of the current control cycle was "No" because the vehicle speed limit VL (step S2) was larger in the current control cycle than in the previous control cycle. If not, i.e., if the result of step S61 of the current control cycle was "No" because the current vehicle speed VSP is lower than in the previous control cycle, then the transmission controller 7 proceeds to step S69.

In step S69, the transmission controller 7 changes the downshift schedule to the normal downshift schedule. The transmission controller 7 then ends the control loop. The change of the downshift schedule executed in step S62 is for obtaining a downshift schedule that ensures that the engine rotational speed does not exceed the engine rotational speed limit. More specifically, the control processing of step S62 serves to prevent the automatic transmission 3 from downshifting if downshifting will cause the engine rotational speed to exceed the engine rotational speed limit and, thus, serves to limit the upper limit value of the engine rotational speed.

In this embodiment, only the steps S61, S62, and S69 of FIG. 4, described above, are needed for changing the downshift schedule. The remaining steps S63 to S67 shown in FIG. 4 are supplemental steps serving to enable the shift control of the automatic transmission 3 to be accomplished in a more favorable manner. These steps will be described in more detail later.

Figure 6:
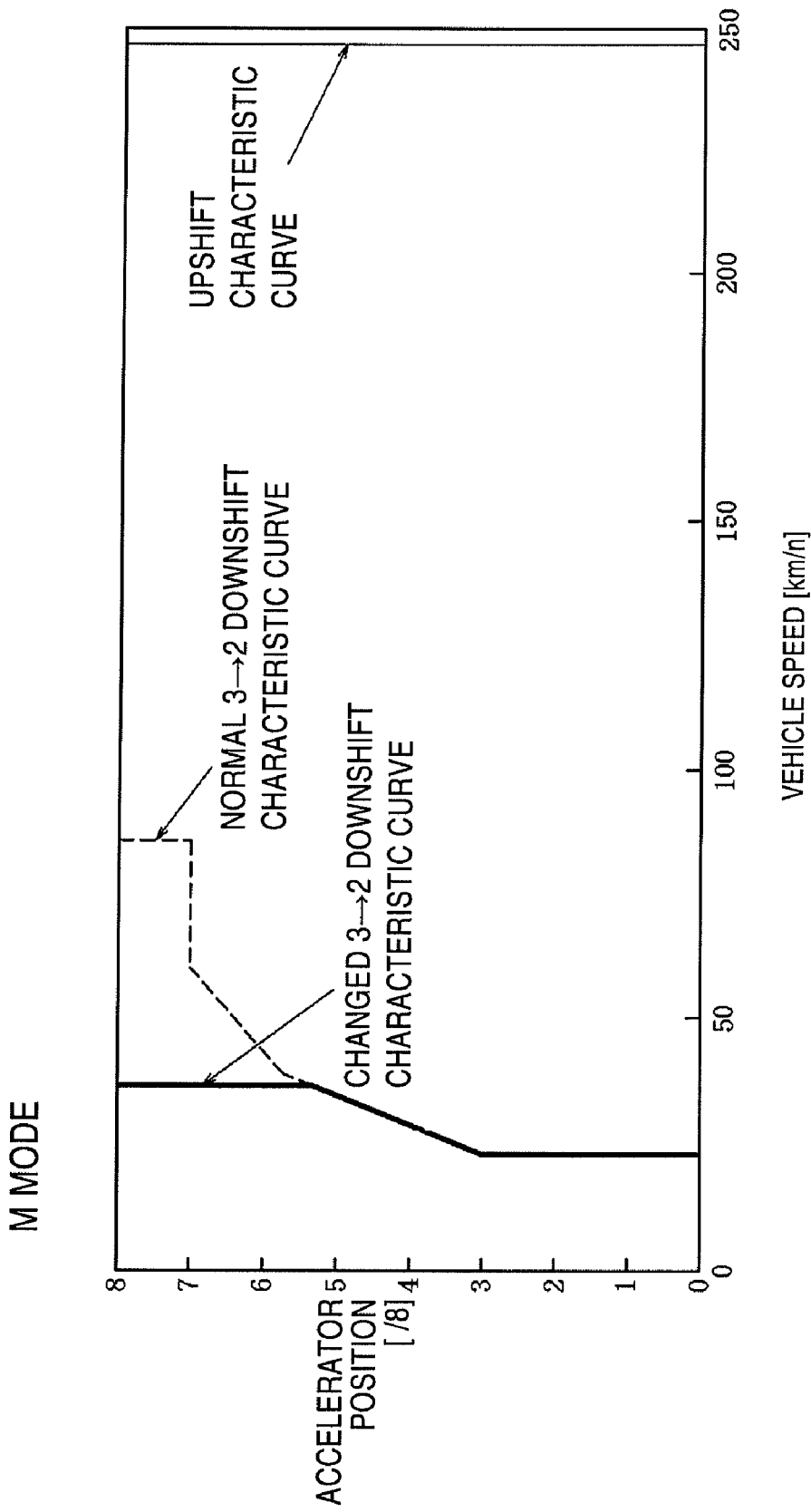
FIG. 6 is a shift characteristic diagram showing an example of how the shift schedule is changed in accordance with the illustrated embodiment when a manual shift (M) mode is selected.

FIGS. 5 and 6 are shift characteristic diagrams illustrating changes of the shift schedule in accordance with this embodiment. FIG. 5 shows examples of how the upshift characteristic curve and the downshift characteristic curve between third and fourth gears are changed when the automatic shifting mode D is selected. FIG. 6 shows an example of the downshift characteristic curve between second and third gears when the manual shifting mode M is selected. The upshift characteristic curves and downshift characteristic curves corresponding to the other gears are not shown in the figures but are changed in a similar manner to the changes shown in FIGS. 5 and 6.

Under normal conditions in which the upper limit value of the engine rotational speed is not limited, the normal shift characteristic curves shown in FIG. 5 are used. The normal shift characteristic curves are indicated with broken lines in a higher vehicle speed region and with solid lines in a lower vehicle speed region. FIG. 5 corresponds to a situation in which the result of step S1 was "No" or a situation in which the transmission controller 7 has entered step S54. As a reference, FIG. 5 shows the vehicle speed VL0 corresponding the prescribed normal upper limit value when the selected gear is third.

FIG. 5 shows a vehicle speed limit VL1 calculated in step S2, a compulsory upshift vehicle speed VU1 calculated in step S3, and a downshift prohibition vehicle speed VF1 calculated in step S4, each of which is calculated when a particular engine rotational speed limit is set. Then, when the transmission controller 7 executes steps S53 or S62, the upshift characteristic curve and the downshift characteristic curve are each moved from the normal shift characteristic curves toward a lower vehicle speed in the direction of the arrows shown in FIG. 5. After the change, the upshift characteristic curve 1 corresponds to the compulsory upshift vehicle speed VU1 for third gear and the downshift characteristic curve 1 corresponds to the downshift prohibition vehicle speed VF1 for third gear. The shift characteristic curve that results after the shift schedule has been changed is the combination of the vertical shift characteristic curve 1 indicated as a solid line in FIG. 5, a portion of the normal shift characteristic curve that is indicated as a broken line in FIG. 5 and that extends diagonally from the bottom end of the shift characteristic curve 1 in a direction of decreasing vehicle speed and decreasing accelerator position (depression amount), and a portion of the normal shift characteristic curve that is indicated as a solid line in FIG. 5 and that extends diagonally in a direction of decreasing vehicle speed and decreasing accelerator position (depression amount).

FIG. 5 also shows a vehicle speed limit VL2 (<VL1) calculated in step S2, a compulsory upshift vehicle speed VU2 (<VU1) calculated in step S3, and a downshift prohibition vehicle speed VF2 (VF1) calculated in step S4, each of which is calculated when a engine rotational speed limit is set which is smaller than the particular engine rotational speed limit mentioned above. As shown in FIG. 5, the upshift characteristic curve and the downshift characteristic curve are both changed in the direction of the arrows to lower vehicle speeds than the normal shift characteristic curves and the shift characteristic curves 1. After the change, the upshift characteristic curve 2 corresponds to the compulsory upshift vehicle speed VU2 for third gear and the downshift characteristic curve 2 corresponds to the downshift prohibition vehicle speed VF2 for third gear. The shift characteristic curve that results after the shift schedule has been changed is the combination of the vertical shift characteristic curve 2 indicated as a solid line in FIG. 5, a portion of the normal shift characteristic curve that is indicated as a broken line in FIG. 5 and that extends diagonally from the bottom end of the shift characteristic curve 2 in a direction of decreasing vehicle speed and decreasing accelerator position (depression amount), and a portion of the normal shift characteristic curve that is indicated as a solid line in FIG. 5 and that extends diagonally in a direction of decreasing vehicle speed and decreasing accelerator position (depression amount). These changes correspond to a situation in which the transmission controller 7 enters the steps S53 or S62.

Thus, in this embodiment, the smaller the engine rotational speed limit becomes (e.g., rotational speed limits corresponding to VL1 and VL2), the more the shift characteristic curves are changed toward lower vehicle speeds. In this way, the shift schedule of the automatic transmission can be changed in accordance with the magnitude of the engine rotational speed limit. As a result, the driver does not experience a feeling that there is something odd about the performance of the vehicle.

Even when the engine rotational speed limit is much lower than the prescribed normal upper limit value such that the compulsive upshift speed limit VU and the downshift prohibition vehicle speed VF are changed to much lower values, they are not changed to lower vehicle speed values than the upshift limit line and downshift limit line indicated with narrow broken lines on the leftward side (lower vehicle speed side) of FIG. 5. This is to prevent a high gear, i.e., third gear or fourth gear, from being selected while the vehicle is traveling at a low speed.

While the M mode is selected, the transmission controller 7 does not change the upshift characteristic curve (the result of step S52 is No) and only changes the downshift characteristic curve (step S62).

FIG. 6 is a shift schedule showing a change of the downshift characteristic curve while the M mode is selected. The downshift characteristic curve is changed during the M mode in order to prevent a manual downshift operation executed by the driver from causing the engine rotational speed to exceed the engine rotational speed limit.

An alternative embodiment can be obtained by configuring the transmission controller 7 to change the upshift characteristic curve to a higher vehicle speed than the vehicle speed corresponding to the prescribed normal upper limit value instead of merely returning the upshift characteristic curve to the vehicle speed corresponding to the prescribed normal upper limit value, as in step S54, when the M mode is selected. Such a change is illustrated with the thin solid line shown on the right side (high vehicle speed side) of FIG. 6. With such a change, upshifting can be essentially prohibited.

Returning to FIG. 4, a shift control scheme for the automatic transmission 3 that more effectively alleviates the feeling that something is odd about the vehicle performance incurred by the conventional technology can be obtained by adding the steps S63 to S67 to the steps S61, S62, and S69. These additional steps serve to hold the prohibition of downshifting when a prescribed condition exists.

Figure 7:
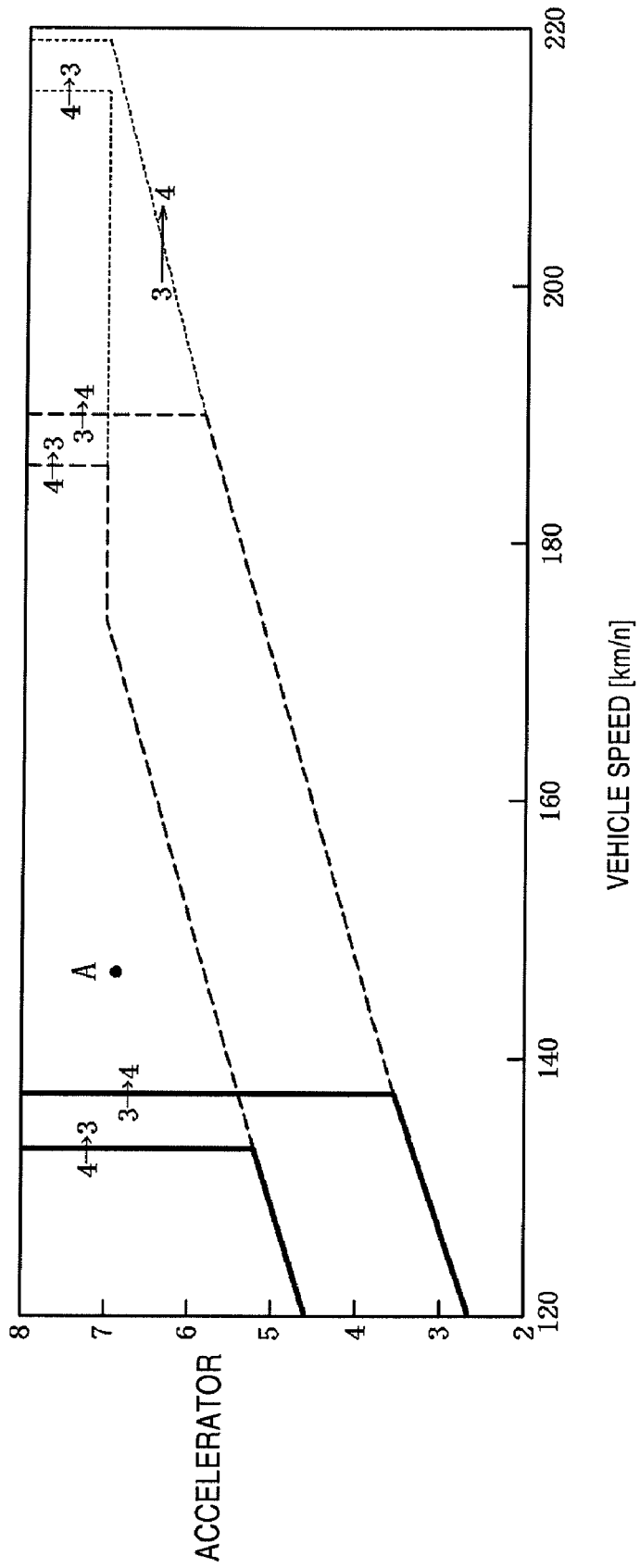
FIG. 7 is a shift characteristic diagram illustrating an example of the operation of the illustrated embodiment in which, initially, the shift schedule has already been changed and when the engine rotational speed limit indicates that the shift schedule should be changed again, the shift schedule obtained in the previous cycle of the main flowchart is held in effect instead of changing the shift schedule.
Figure 8:
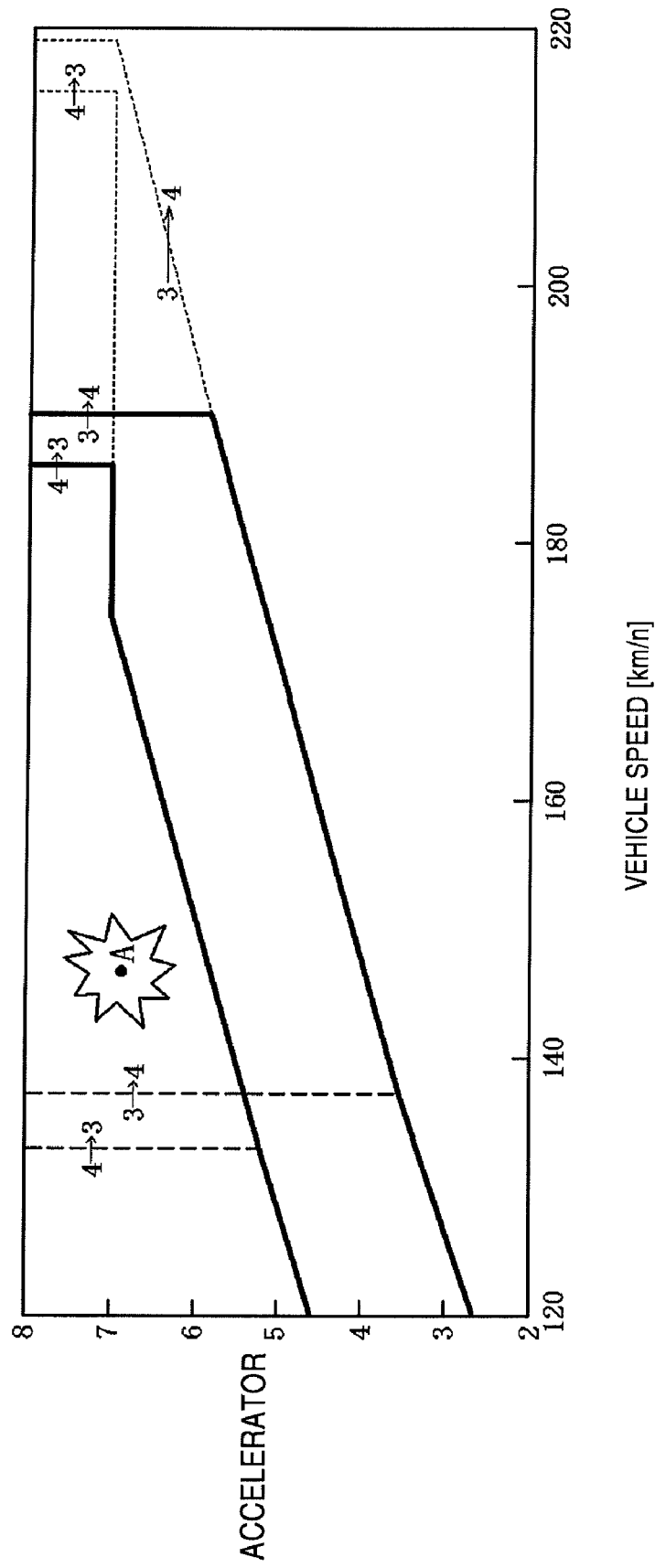
FIG. 8 is a shift characteristic diagram illustrating the downshift characteristic curve to which the shift schedule should be changed based on the state that is assumed to exist in FIG. 7.
Figure 9:
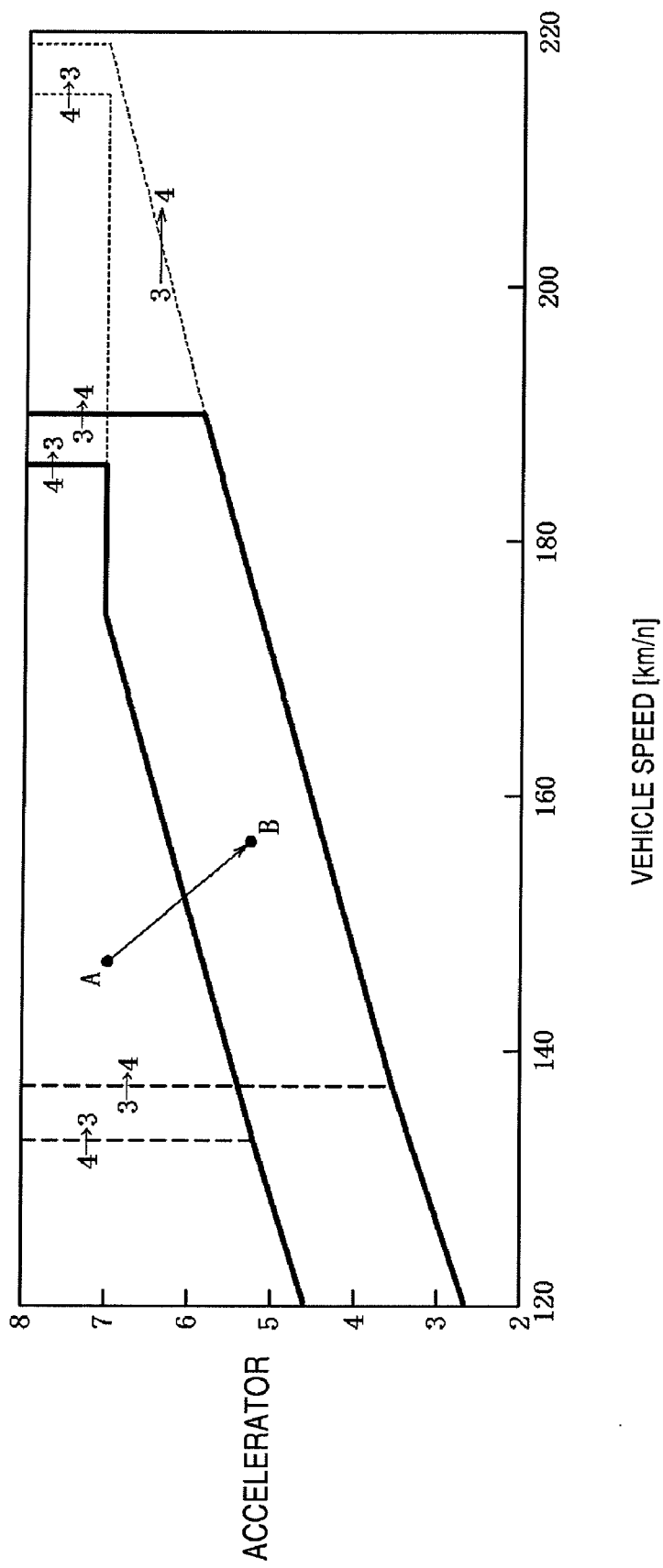
FIG. 9 is a shift characteristic diagram illustrating a case in which the downshift characteristic curve is changed in accordance with the state that is assumed to exist in FIG. 7.

FIGS. 7 to 9 illustrate on a shift schedule diagram examples of changing the downshift characteristic curves and holding the downshift prohibition by executing the steps S63 to S67. FIG. 10 is a table summarizing the content of FIGS. 7 to 9.

In step S63, the transmission controller 7 determines if the downshift prohibition vehicle speed VF was not held in step S67 (discussed later) of the previous cycle of the main flowchart, i.e., if the downshift prohibition vehicle speed VF was changed. If the downshift prohibition vehicle speed was held (No in step S63), then the transmission controller 7 proceeds to step S66 (discussed later). If the downshift prohibition vehicle speed VF was changed (Yes), then the transmission controller 7 proceeds to step S64. The purpose of step S63 is to determine whether or not the downshift prohibition vehicle speed VF, i.e., the downshift characteristic curve, has been changed.

In step S64, the transmission controller 7 determines if the result of step S61 ("Is the current vehicle speed VSP larger than downshift prohibition vehicle speed VF?") was "No" because the vehicle speed limit VL, i.e., the downshift prohibition vehicle speed VF, increased. The purpose of step S64 is to determine if the downshift prohibition vehicle speed VF was changed to a higher vehicle speed, i.e., if the engine rotational speed limit increased or if the limitation of the upper limit value of the engine rotational speed was ended. If, instead, the result of step S61 was "No" because the current vehicle speed VSP decreased, i.e., if the result of step S64 is "No," then the transmission controller 7 proceeds to step S69 because the engine rotational speed will not exceed the engine rotational speed limit even if the transmission 3 downshifts or because any downshifting will concur with a decrease in the vehicle speed and will not cause the driver to feel that something is odd about the vehicle performance.

Conversely, if the result of step S64 is "Yes," i.e., if the downshift prohibition vehicle speed VF rose, then the transmission controller 7 proceeds to step S65.

In step S65, the transmission controller 7 determines if the downshift schedule was changed based on the downshift prohibition vehicle speeds VF in the previous control cycle. More specifically, the transmission controller 7 determines if the downshift characteristic curves were changed in step S62 to the downshift characteristic curves calculated based on the downshift prohibition vehicle speeds VF in step S4 of the previous cycle of the main flowchart. If the shift schedule has not been changed to the downshift characteristic curves based on the downshift prohibition vehicle speeds VF calculated in the previous control cycle, then the transmission controller 7 proceeds to step S69 because downshifting will not occur even if the transmission controller 7 proceeds to step S69.

Conversely, if the transmission controller 7 determines in step S65 that, in step S62 of the previous control cycle, the shift schedule was changed to the downshift characteristic curves calculated based on the downshift prohibition vehicle speeds VF in step S4 of the previous cycle, i.e., if the result of step S65 is "Yes," then the transmission controller 7 proceeds to step S66.

In step S66, the transmission controller 7 determines if a current operating point (operating point of current control cycle) is within a downshift region corresponding to the downshift schedule that would result if the downshift schedule was changed based on the downshift prohibition vehicle speeds of the current control cycle. There is a possibility that the operating point existing during the current cycle of the main flowchart is the same as the operating point that existed during the previous cycle of the main flowchart, i.e., that the operating point has not changed. The purpose of step S66 is to determine if changing to the downshift characteristic curves based on the current control cycle will cause the same operating point, which was not in the downshift region based on the downshift schedule of the previous control cycle, to enter a downshift region.

The operating point mentioned here is a driving state plotted on a shift characteristic diagram. The driving state is defined by the accelerator position and the vehicle speed VSP. As shown in FIG. 5 (discussed later), the accelerator position is indicated on a vertical axis and the vehicle speed VSP indicated on the horizontal axis of the shift characteristic diagram.

If the transmission controller 7 determines in step S66 that the current operating point is in the downshift region (i.e., if the result of step S66 is "Yes"), then the transmission controller 7 proceeds to step S67. In step S67, the transmission controller 7 holds the downshift prohibition vehicle speeds VF at the same values as the previous control cycle even though it has determined that the operating point is in the downshift region. Then, in step S62, the transmission controller 7 changes the shift schedule based on the held downshift prohibition vehicle speeds. In other words, by keeping the same shift schedule as the previous control cycle, the transmission controller 7 prohibits downshifting and keeps the transmission 3 in the current gear. The transmission controller 7 then ends the control loop.

Conversely, if the result of step S66 is "No," i.e., if the transmission controller 7 determines that the operating point is outside the downshift region and downshifting will not occur even if the shift schedule is changed back to the normal shift schedule, then the transmission controller 7 proceeds to step S69. Then, the transmission controller 7 changes to the normal downshift schedule in step S69, and then the control loop ends.

The manner in which the downshift schedule is changed in steps S63 to S67 will now be explained with reference to the shift schedules shown in FIGS. 7 to 9. Each of FIGS. 7 to 9 shows three sets of shift characteristic curves indicated with different line types (solid, broken, and dotted). The right-hand shift characteristic curve (shift characteristic curve positioned toward higher vehicle speeds) is an upshift characteristic curve and the left-hand shift characteristic curve (shift characteristic curve positioned toward lower vehicle speeds) is a downshift characteristic curve.

Initially, as shown in FIG. 7, it will be assumed that the downshift characteristic curve has been changed as indicated with the solid-line curve, the operating point is a point "A", and the currently selected gear is fourth gear (result of step S65 is "Yes").

Then, the engine rotational speed limit increases such that the downshift characteristic curve should be changed as indicated with the solid-line curve shown in FIG. 8. As a result, in the current control cycle, the operating point "A" is within the downshift region of the 4→3 downshift characteristic curve for shifting from fourth gear to third gear (i.e., the result of step S66 is "Yes").

In such a case, even though, according to FIG. 8, the selected gear should be the fourth gear based on the operating point "A", the downshift schedule is not changed to the downshift characteristic curve indicated with a solid-line curve in FIG. 8 and, instead, is held to the downshift characteristic curve indicated with a solid line in FIG. 7. As a result, the prohibition against downshifting to third gear is held in place (step S67).

Afterwards, the main flowchart is repeated and it is detected that the operating point has moved from the point "A" to a point "B", as shown in FIG. 9. In this example, the operating point "B" of the current cycle is outside the downshift region of the 4→3 downshift characteristic curve (i.e., the result of step S66 is "No").

In this case, the 4→3 downshift characteristic curve is changed to the normal shift schedule indicated with a dotted-line curve on the right-hand side (higher vehicle speeds) of FIG. 9.

FIG. 10 summarizes the change shown of the downshift characteristic curve toward lower vehicle speeds in FIG. 7, the downshift characteristic curve that that would normally be obtained based on the current engine rotational speed limit should be adopted afterwards as shown in FIG. 8, and the change of the downshift schedule toward higher vehicle speeds shown in FIG. 9 such that the downshift characteristic curve that should be adopted is obtained.

In FIG. 10, "UP" in the MAP column means that the corresponding row indicates how the 3→4 upshift characteristic curve changes over time when the selected gear is third gear, and "DN" in the MAP column means that the corresponding row indicates how the 4→3 downshift characteristic curve changes over time when the selected gear is fourth gear. The change in the driving state (operating point) and the shift schedule over time is indicated as one moves from the leftmost column to the rightmost column of FIG. 10. An operating point "A" exists initially before the engine rotational speed limit is changed and continues after the engine rotational speed limit changes. Afterwards, the operating point changes to an operating point "B".

The shift schedule change that occurs in the initial state when the operating point is the operating point "A" and the engine rotational speed limit has not yet changed will now be explained with reference to the shift schedule diagram shown in FIG. 7. More specifically, the "compulsory upshift" indicated in the "Point "A" before limit change" column of FIG. 10 means that the 3→4 upshift characteristic curve has been changed such that the gear is compulsorily upshifted, as indicated with the solid-line curve in FIG. 7. That is, before the engine rotational speed limit changes, it is assumed that the engine rotational speed limit has been severely limited and that the 3→4 upshift characteristic curve has been moved far to the left, i.e., to a much lower vehicle speed region, to facilitate the limitation of the engine rotational speed. Meanwhile, the "downshift prohibition" indicated in the "Point "A" before limit change" column of FIG. 10 means that the 4→3 downshift characteristic curve has been changed such that downshifting is prohibited such that downshifting that would cause the engine rotational speed to exceed the engine rotational speed limit is prohibited.

The shift schedule change that occurs after the engine rotational speed limit has been changed while the operating point remains at the operating point "A" will now be explained with reference to the shift schedule diagram shown in FIG. 8. More specifically, "hold compulsory upshift" indicated in the "Point "A" after limit change" column of FIG. 10 means that the 3→4 upshift characteristic curve is held in the leftward position (lower vehicle speed) indicated with a broken line in FIG. 8. That is, even though the engine rotational speed limit has changed, the 3→4 upshift characteristic curve is held in a compulsory upshift position because the operating point has not changed. More specifically, even though the limitation of the engine rotational speed limit has been eased and the 3→4 upshift characteristic curve should be changed to a higher vehicle speed region as indicated with a solid-line curve in FIG. 8, the 3→4 upshift characteristic curve is held in the same position as before the engine rotational speed limit changed because the driving state is still at the operating point "A". Meanwhile, "hold downshift prohibition" indicated in the "Point "A" after limit change" column of FIG. 10 means that the 4→3 downshift characteristic curve is held in the leftward position (lower vehicle speed) indicated with a broken line in FIG. 8. That is, even though the engine rotational speed limit has changed, the prohibition of downshifting is continued because the operating point has not changed. More specifically, even though the limitation of the engine rotational speed limit has been eased and the 4→3 downshift characteristic curve should be changed to a higher vehicle speed region, the 4→3 downshift characteristic curve is held in the same position as before the engine rotational speed limit changed in order to prevent the engine rotational speed from rising, which would occur if the transmission 3 downshifted while the driving state was still at the operating point "A".

The shift schedule change that occurs after the engine rotational speed limit has been changed and the operating point has changed to the operating point "B" will now be explained with reference to the shift schedule diagram shown in FIG. 9. More specifically, "normal shift schedule" indicated in the portion of the "Point "B" after limit change" column corresponding to third gear in FIG. 10 means that the hold imposed on the 3→4 upshift characteristic curve is removed and 3→4 upshift characteristic curve is moved in the leftward direction (toward higher vehicle speeds) to the normal upshift characteristic curve indicated with a dotted line in FIG. 9. The 3→4 upshift characteristic curve is moved to the normal position because the driving state has changed to a point "B" that is outside the shift region of the upshift characteristic curve that would normally be set based on the engine rotational speed limit, i.e., the 3→4 upshift characteristic curve indicated with a solid-line curve in FIG. 9. Meanwhile, "normal shift schedule" indicated in the portion of the "Point "B" after limit change" column corresponding to fourth gear (cruising gear) in FIG. 10 means that the hold imposed on the 4→3 downshift characteristic curve is removed and 4→3 downshift characteristic curve is moved in the leftward direction (toward higher vehicle speeds) to the normal upshift characteristic curve indicated with a dotted line in FIG. 9. The 4→3 downshift characteristic curve is moved to the normal position because the driving state has changed to a point "B" that is outside the shift region of the downshift characteristic curve that would normally be set based on the engine rotational speed limit, i.e., the 4→3 downshift characteristic curve indicated with a solid-line curve in FIG. 9.

When steps S63 to S67 are included in the downshift schedule change scheme of this embodiment, the shift schedule is not changed (as shown in FIG. 7), and thus, the prohibition of downshifting is continued in cases where the driver is not depressing the accelerator pedal 31 or the operating point does not change. As a result, a situation in which the shift schedule changes and the driver is surprised by unexpected downshifting can be avoided. In other words, the driver can be prevented from experiencing a feeling that something is odd about the vehicle performance.

Meanwhile, the shift schedule is changed if the operating point changes as shown in FIG. 9, thus enabling the feeling that there is something odd about the vehicle performance to be alleviated.

Figure 11:
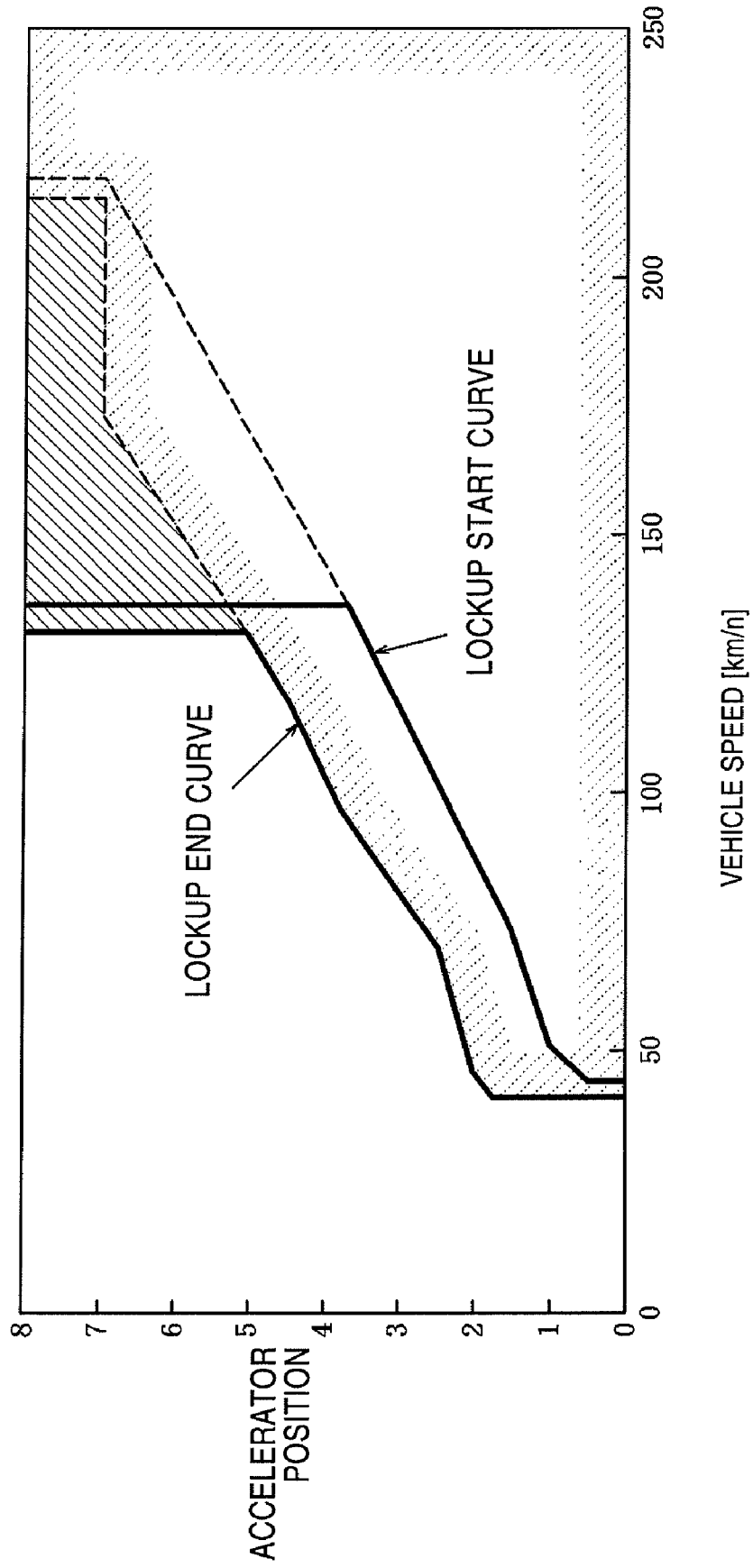
FIG. 11 illustrates a lockup schedule used for controlling the connection and release of a lockup mechanism in accordance with the illustrated embodiment and an example of changing the lockup schedule.
Figure 12:
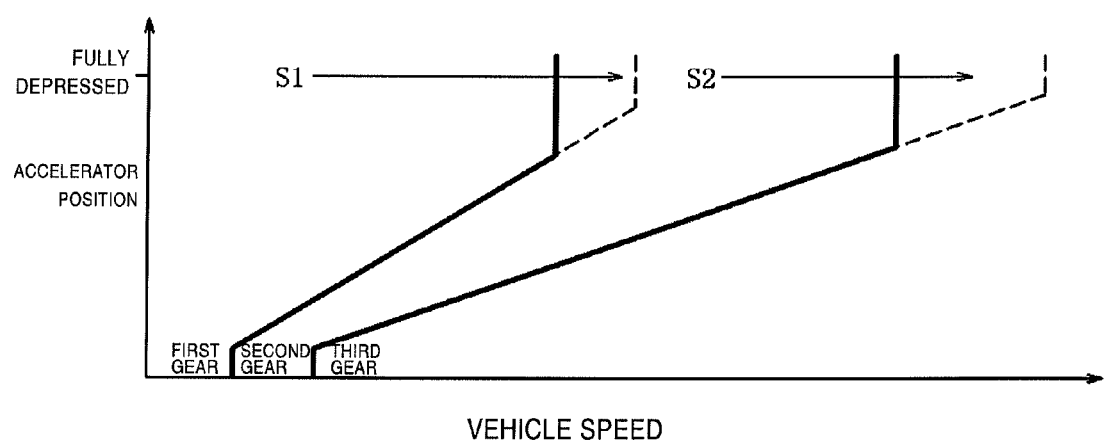
FIG. 12 is a shift characteristic diagram illustrating a conventional shift schedule change.

An even more preferable effect can be obtained by controlling the lockup mechanism of the torque converter 2 such that the lockup mechanism connects (locks up) when the highest gear (fourth gear) is selected and changing a characteristic curve of a lockup schedule in coordination with the previously described changing of the shift schedule. More specifically, under normal circumstances in which the shift characteristic curves for the third and fourth gears are not changed (i.e., when the upper limit value of the engine rotational speed is not limited), the lockup region indicated with broken line hatching in FIG. 11 is set to be in a region of higher vehicle speeds than the downshift characteristic curve. In other words, the normal downshift characteristic curve coincides with a lockup end curve.

When the shift characteristic curves of the third and fourth gears are changed to a lower vehicle speed region as indicated with the solid-line curves shown in FIG. 11 due to limitation of the upper limit value of the engine rotational speed to an engine rotational speed limit, the lockup region is expanded according to the change of the downshift characteristic curve, as indicated with solid line hatching in FIG. 11. After the changes, the downshift characteristic curve again coincides with the changed lockup end curve.

By changing the lockup schedule in accordance with the change of the shift schedule, the lockup clutch can be prevented from releasing at a different timing than the timing at which the automatic transmission 3 shifts gears. As a result, revving of the engine (increased engine speed) caused by releasing the lockup clutch and physical shock caused by reconnecting the lockup clutch can be prevented.

This embodiment is based on the assumption that the shift control apparatus is provided with respect to an automatic transmission 3 that is arranged to receive power from an engine 1 and that the automatic transmission control apparatus is configured to change a shift schedule as indicated with solid line curves in FIG. 5 when an upper limit value of a rotational speed of the engine 1 is limited to an engine rotational speed limit that is lower than a prescribed normal upper limit value, the change of the shift schedule being such that the automatic transmission 3 has a stronger tendency to select a higher gear stage (or lower gear ratio) than when the engine rotational speed is not being limited (i.e., than normal). The normal characteristic curves are indicated with broken lines in FIG. 5. If the engine rotational speed limit corresponds to a vehicle speed limit VL1, then the amount by which the shift schedule will be changed is determined (in steps S2 to S4) based on based on the vehicle speed limit VL1 such that the engine rotational speed will be below the engine rotational speed limit corresponding to the vehicle speed limit VL1. Then, the shift schedule is changed according to the engine rotational speed limit corresponding to the vehicle speed limit VL1, as indicated by the shift characteristic curve 1 shown in FIG. 5. As a result, when the amount by which the upper limit value of the engine rotational speed is changed is small, i.e., when the engine rotational speed limit is large and close to the prescribed normal upper limit value, upshifting can be executed at an engine rotational speed that is close to the normal engine rotational speed.

Meanwhile, if the engine rotational speed limit corresponds to a vehicle speed limit VL2, then the amount by which the shift schedule will be changed is determined (in steps S2 to S4) based on the engine rotational speed limit corresponding to the vehicle speed limit VL2 such that the engine rotational speed will be below the engine rotational speed limit corresponding to the vehicle speed limit VL2. Then, the shift schedule is changed according to the engine rotational speed limit corresponding to the vehicle speed limit VL2, as indicated by the shift characteristic curve 2 shown in FIG. 5. As a result, when the amount by which the upper limit value of the engine rotational speed is changed is large, i.e., when the engine rotational speed limit is small and distant from the prescribed normal upper limit value, upshifting can be executed at an engine rotational speed that is equal to or smaller than the engine rotational speed limit. Thus, the automatic transmission can be upshifted appropriately in accordance with the magnitude of the set engine rotational speed limit and the driver can be prevented from experiencing a feeling that something is odd about the vehicle performance.

The smaller the engine rotational speed limit is, the more the upshift characteristic curve of the shift schedule is moved leftward as indicated with the large arrows in FIG. 5 (i.e., toward lower vehicle speeds). Similarly, smaller the engine rotational speed limit is, the more the downshift characteristic curve of the shift schedule is moved leftward as indicated with the large arrows in FIG. 5 (i.e., toward lower vehicle speeds). As a result, the automatic transmission can be upshifted appropriately in accordance with the magnitude of the set engine rotational speed limit.

With this embodiment, if the vehicle is provided with a selector mechanism 11 that enables the driver to select a manual shift (M) mode in which the automatic transmission 3 shifts in response to shift operations performed by the driver, then when the manual shift (M) mode is selected and the upper limit value of the engine rotational speed is being limited to the engine rotational speed limit, the automatic transmission 3 upshifts in response to an upshift operation performed by the driver and downshifts in response to a downshift operation performed by the driver so long as downshifting will not cause the engine rotational speed to exceed the engine rotational speed limit. More specifically, the changed downshift characteristic curve is set such that downshifting that will not cause the engine rotational speed to exceed the engine rotational speed limit is permitted.

As a result, when the engine rotational speed is limited during the manual shift (M) mode, the engine rotational speed will remain below the engine rotational speed limit even if the driver downshifts (i.e., the control ignores the driver's downshift operation).

When the vehicle speed does not rise during the manual shift (M), the driver can upshift the automatic transmission 3. Thus, another effect of this embodiment is that upshifting of the automatic transmission 3 can be left to the driver such that upshifting not intended by the driver can be suppressed and the driver can be prevented from experiencing a feeling that something is odd about the vehicle performance.

In this embodiment, the upshift characteristic curve of the shift schedule is changed within a region of vehicle speeds higher than the vehicle speed corresponding to a prescribed upshift limit line set in a low vehicle speed region as shown on the left-hand side of FIG. 5, and the downshift characteristic curve of the shift schedule is changed within a region of vehicle speeds higher than the vehicle speed corresponding to a prescribed downshift limit line set in a low vehicle speed region as shown on the left-hand side of FIG. 5. As a result, a lower limit is set with respect to changing the shift schedule and selection of a high gear can be avoided when the vehicle is in a low vehicle speed region. Additionally, since the torque capacity of the frictional holding elements (not shown) inside the automatic transmission 3 that serve to select higher gear stages is smaller than the torque capacity of the frictional holding elements that serve to select lower gear stages, the occurrence of shift shock resulting from insufficient capacity of the frictional holding elements can be suppressed.

There are situations in which the downshift characteristic curve has been changed to a lower vehicle speed region as indicated with a solid-line curve in FIG. 7 such that downshifting is prohibited and, then, the engine rotational speed limit increases or the limitation of the upper limit value of the engine rotational speed ends such that the downshift characteristic curve should be changed to a higher vehicle speed region as indicated with the solid-line or dotted line curve shown in FIG. 8. However, with this embodiment, if the operating point remains at the point "A" shown on the shift characteristic diagram, the downshift characteristic curve is held in the state indicated with a solid-line curve in FIG. 7. As a result, even though the engine rotational speed limit has changed such that the current operating point (vehicle speed and accelerator depression amount) is in a downshift region, it will feel more natural to the driver if the transmission does not downshift because the operating point is the same as before the engine rotational speed limit changed. In other words, the only thing that changed is the engine rotational speed limit and that is not a problem because it is only a control quantity and not something that is readily noticeable by the driver. Thus, the driver can be prevented from experiencing a feeling that something is odd about the vehicle performance. Conversely, downshifting would be very noticeable.

The downshift characteristic curve continues to be held until the operating point moves from the point "A" to a point outside the downshift region defined by the solid-line downshift characteristic curve shown in FIG. 8, which is the downshift characteristic curve that would have been adopted had the initial downshift characteristic curve not been held. FIG. 9 illustrates an example in which the operating point has moved from the point "A" to a point "B" outside the downshift region of the solid-line downshift characteristic curve shown in FIG. 8. By holding the downshift characteristic curve until the operating point is outside the downshift region, the downshift characteristic curve can be changed without causing the automatic transmission 3 to downshift. Thus, downshifting not intended by the driver can be prevented and the downshift characteristic curve can be changed appropriately in accordance with the engine rotational speed limit. As a result, the driver can be prevented from experiencing a feeling that something is odd about the vehicle performance and shift shock can be avoided even more reliably.

In this embodiment, the automatic transmission 3 is provided with a torque converter 2 having a lockup mechanism and a lockup clutch of the lockup mechanism is controlled, i.e., connected and released, according to a lockup schedule. As shown in FIG. 11, the lockup schedule is changed to a lower vehicle speed region in conjunction with changing the shift schedule. By changing the lockup schedule in accordance with the change of the shift schedule, the lockup clutch can be prevented from releasing at a different timing than the timing at which the automatic transmission 3 shifts gears. As a result, unintended revving of the engine (increased engine speed) caused by releasing the lockup clutch and physical shock caused by reconnecting the lockup clutch can be prevented.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the particular gear numbers stated in the figures and the numeric values indicated on the vertical and horizontal axes of the figures (e.g., FIG. 5) are not intended to limit the present invention in any way. The functions of one element can be performed by two, and vice versa. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An automatic transmission control apparatus comprising:
    an engine rotational speed limit verifying section configured to receive an engine rotational speed limit value for limiting an engine rotational speed and determine if the engine rotational speed limit value is lower than a prescribed normal upper limit value; and
    a shift control characteristic changing section configured to change a shift schedule of an automatic transmission based on the engine rotational speed being limited by the engine rotational speed limit value and the automatic transmission having a stronger tendency to select a higher gear stage than if the engine rotational speed limit value was not being limited to a lower value than the prescribed normal limit value, when the engine rotational speed limit value is determined to lower than the prescribed normal upper limit value.

2. The automatic transmission control apparatus as claimed in claim 1, wherein
    the shift control characteristic section is further configured to change the shift schedule of the automatic transmission in accordance with a magnitude of the engine rotational speed limit value being set.

3. The automatic transmission control apparatus as claimed in claim 1, wherein
    the shift control characteristic changing section includes
        an upshift characteristic curve changing section configured to enable upshifting when the engine rotational speed is equal to or below the engine rotational speed limit value by changing an upshift characteristic curve of the shift schedule such that as the current engine rotational speed limit value becomes smaller, the upshift characteristic curve is changed farther in a direction of lower vehicle speeds; and
        a downshift characteristic curve changing section configured to prohibit downshifting that would cause the engine rotational speed to exceed the engine rotational speed limit value by changing a downshift characteristic curve of the shift schedule such that as the engine rotational speed limit value becomes smaller, the downshift characteristic curve is changed farther in a direction of lower vehicle speeds.

4. The automatic transmission control apparatus as claimed in claim 3, further comprising
    a manual shift mode determining section configured to determine selection of a manual shift mode in which the automatic transmission is shifted in response to a shift operation performed by a driver;
    the downshift characteristic curve changing section being further configured to prohibit a manual down shift that would cause the engine rotational speed to exceed the engine rotational speed limit value; and
    upshift characteristic curve changing section being further configured to a manual upshift operation.

5. The automatic transmission control apparatus as claimed in claim 3, wherein
    the upshift characteristic curve changing section is further configured to change the upshift characteristic curve of the shift schedule within a region corresponding to higher vehicle speeds than a prescribed upshift limit line that is set in a low vehicle speed region; and
    the downshift characteristic curve changing section is further configured to change the downshift characteristic curve of the shift schedule within a region corresponding to higher vehicle speeds than a prescribed downshift limit line that is set in a low vehicle speed region.

6. The automatic transmission control apparatus as claimed in claim 3, wherein
    the downshift characteristic curve changing section is further configured to maintain the downshift characteristic curve if, while the downshift characteristic curve changing section is prohibiting downshifting, a driving state has not changing and changing the downshift characteristic curve is estimated to cause the automatic transmission to downshift, when the engine rotational speed limit value increases or the limitation of the engine rotational speed limit value ends such that the downshift characteristic curve would otherwise be changed in a direction of a higher vehicle speed.

7. The automatic transmission control apparatus as claimed in claim 3, wherein
    the downshift characteristic curve changing section is further configured to continue to maintain the downshift characteristic curve until a driving state changes so as to be outside a shift region defined by the downshift characteristic curve that would otherwise be adopted based on the engine rotational speed limit value but is not being adopted because the downshift characteristic curve is being maintained.

8. The automatic transmission control apparatus as claimed in claim 1, further comprising
    a lockup mechanism control section configured to control connecting and releasing of a lockup mechanism of a torque converter of the automatic transmission such that a lockup schedule of the lockup mechanism is changed in a direction of a lower vehicle speed in correspondence to a change in the shift schedule by the shift control characteristic changing section.

9. An automatic transmission control apparatus comprising:
    engine rotational speed limit verifying means for receiving an engine rotational speed limit value for limiting an engine rotational speed and determining if the engine rotational speed limit value is lower than a prescribed normal upper limit value; and shift control characteristic changing means for changing a shift schedule of an automatic transmission based on the engine rotational speed being limited by the engine rotational speed limit value and the automatic transmission having a stronger tendency to select a higher gear stage than if the engine rotational speed limit value was not being limited to a lower value than the prescribed normal limit value, when the engine rotational speed limit value is determined to be the lower than the prescribed normal upper limit value.

10. An automatic transmission control method comprising:

receiving an engine rotational speed limit value for limiting an engine rotational speed;

determining if the engine rotational speed limit value is lower than a prescribed normal upper limit value; and changing a shift schedule of an automatic transmission based on the engine rotational speed being limited by than the engine rotational speed limit value and the automatic transmission having a stronger tendency to select a higher gear stage than if the engine rotational speed limit value was not being limited to a lower value than the prescribed normal limit value, when the engine rotational speed limit value is determined to be the lower than the prescribed normal upper limit value.

* * * * *